(12) United States Patent
Vasilantone

(10) Patent No.: US 7,191,855 B2
(45) Date of Patent: Mar. 20, 2007

(54) ROTARY ENGINE WITH IMPROVED HYBRID FEATURES

(76) Inventor: Michael M. Vasilantone, 22 Shelley Rd., Brick, NJ (US) 08724

( * ) Notice: Subject to any disclaimer, the term of this patent is extended or adjusted under 35 U.S.C. 154(b) by 360 days.

(21) Appl. No.: 10/818,853

(22) Filed: Apr. 7, 2004

(65) Prior Publication Data
US 2005/0224263 A1    Oct. 13, 2005

(51) Int. Cl.
B60K 6/04 (2006.01)
(52) U.S. Cl. ............... 180/65.1; 180/65.4; 903/925
(58) Field of Classification Search ......... 180/65.1, 180/65.2, 65.3, 65.4; 903/925, 947
See application file for complete search history.

(56) References Cited
U.S. PATENT DOCUMENTS

| 5,161,378 | A | * | 11/1992 | Murray et al. ........... 60/718 |
| 5,403,244 | A | * | 4/1995 | Tankersley et al. ........... 477/20 |
| 5,813,488 | A | * | 9/1998 | Weiss ........... 180/65.6 |
| 6,005,297 | A | * | 12/1999 | Sasaki et al. ........... 290/4 C |
| RE36,678 | E | * | 5/2000 | Moroto et al. ........... 180/65.4 |
| 6,371,878 | B1 | * | 4/2002 | Bowen ........... 475/5 |
| 6,402,654 | B1 | * | 6/2002 | Lanzon et al. ........... 475/204 |
| 6,520,879 | B2 | * | 2/2003 | Kawabata et al. ........... 475/5 |
| 6,880,654 | B2 | * | 4/2005 | Plishner ........... 180/65.6 |
| 6,991,054 | B2 | * | 1/2006 | Takaoka et al. ........... 180/65.2 |

* cited by examiner

Primary Examiner—Christopher P. Ellis
Assistant Examiner—Brian L Swenson
(74) Attorney, Agent, or Firm—Charles I. Brodsky

(57) ABSTRACT

A hybrid engine including an electric motor, a rotary internal combustion engine, and an electric generator incorporating a clutch and translator unit to drive the generator at a ratio greater than 1:1 during vehicle slowing and at a 1:1 ratio rate at other times in providing increased braking and fuel efficiency—along with a programmable central control module and vertical control lever in effectuating steering and vehicle operation without the use of a steering wheel or foot gas and brake pedals.

7 Claims, 2 Drawing Sheets

ROTARY ENGINE WITH IMPROVED HYBRID FEATURES

CROSS-REFERENCE TO RELATED APPLICATIONS

None

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to hybrid engines combining electric motors and generators with combustion engines, in general, and to a hybrid engine in which the motor and generator are combined with a rotary internal combustion engine, in particular.

2. Description of the Related Art

As is well known and understood, automotive manufacturers are either producing or developing automobiles with hybrid engines which combine electrical power with internal combustion engines. In these designs, the generator constantly charges the vehicle's batteries, while increasing revolutions during moments of deceleration increases the charging of the batteries and the braking forces applied to the drive shaft. There, the electric motor always assists the engine during vehicle acceleration, but at the same time always senses the drive shaft load in reacting on demand; in these configurations, the electric motor also acts as a primary driver in preventing battery over-charge.

SUMMARY OF THE INVENTION

As will become clear from the following description, the present invention provides a system including an electric motor and generator with a rotary combustion engine. As will be seen more specifically, the engine utilizes a rotary internal combustion engine that incorporates features of my prior U.S. Pat. Nos. 3,971,347 (issued Jul. 27, 1976) and 4,307,695 (issued Dec. 29, 1981), and of my pending U.S. patent application Ser. No. 10/273,532, filed Oct. 21, 2002, now U.S. Pat. No.6,698,395.

a) My patent, No. 3,971,347 describes a rotary internal combustion engine housing and a concentrically arranged chamber within the housing in receiving an eccentrically disposed cylindrical rotor; the rotor cooperates with the chamber to define a crescent-shaped chamber which is sequentially divided into intake, compression, combustion and exhaust chambers by means of vanes which are pivotally mounted on the annular surface of the rotor and which engage the inner surface of the housing in defining the chamber. The resulting configuration provides efficiency of operation, effective sealing between the rotor and the housing, effective minimalization of heat build up due to frictional contact, and a great rigidity and strength.

b) My second patent, No. 4,307,695 provides enhanced operation by having a blower and/or superchargers that are driven by the rotary engine. The design includes a rotor, a plurality of pistons angularly mounted in the rotor, an actuator mounted for eccentric rotation relative to the access of rotation of the rotor, a blower, a transverse actuator pin connecting each piston to the actuator, and a plurality of fixed pins connecting the rotor to the actuator. With the fixed pins mounted on the rotor so as to pass through clearance holes in the blower in carrying extension gears which mate with internal gears mounted in the actuator, rotation of the rotor causes rotation of the blower and of the actuator as well. As there set forth, the rotational force that results changes the pressure line in its direction, moving it towards the direction of rotation as the rotational speed increases.

c) My third patent, No. 6,698,395 describes a hybrid engine that includes the basic configuration of my No. 4,307,695 patent—but, instead of employing its pistons, utilizes the pivoting vane concept of my No. 3,971,347 patent albeit somewhat modified. Also, in so doing, the blower and supercharger of my later design is eliminated—leading to the end result of a very small engine yet with a comparable amount of power as with hybrid engines utilizing standard cylinder engines. This hybrid engine includes an electric generator, an electric motor, and a rotary internal combustion engine that includes pivoted vane elements mounted on a rotor and biased into engagement to sequentially form intake, compression, combustion and exhaust chambers between the rotor and its annular wall.

In accordance with the present invention, the hybrid portion of the rotary engine is modified to include a translator element connected to an electric clutch-brake within the generator component, an operator vertical control lever, and a central programmable control module. As will be seen, these modifications allow for the elimination and replacement of the steering wheel and foot pedals of the conventional vehicle, an increased charging by the generator, and an increased braking of the drive shaft when necessary. The end result will be an increase in fuel efficiency and an increase in operator efficiency.

With the improvements presented by these modifications, the vehicle operator's primary control element becomes the vertical control lever which provides the entire operator driving function—one by which the lever can be moved in four directions; namely, forward for acceleration, rearward for slow-back and full-back in slowing and stopping respectively, and right and left for steering. Requiring less body movement and enhanced physical and mechanical efficiency than with having to turn a steering wheel or operating a gas or brake pedal, the vertical control lever of the invention may further be easily positioned for right and left-hand, and right and left-side vehicle operation, while providing an enhanced visibility of the dashboard indicators.

BRIEF DESCRIPTION OF THE DRAWINGS

These and other features of the present invention will be more clearly understood from a consideration of the following description, taken in connection with the accompanying drawings in which.

DETAILED DESCRIPTION OF THE INVENTION

As with the hybrid engine of my U.S. Pat. No. 6,698,395 invention, the three major components of the hybrid engine here include a gas rotary engine, an electric motor, and an electrical generator forming a uniform cylindrical shape having a common drive shaft which extends through and out each end. Each component will be understood to be mounted on a one-way journal for clockwise rotation along with an electric clutch. Enclosed in a shell casing or block, these components are attached to the vehicle chassis as a power capsule at a position along the traditional drive shaft—one end of which is connected via universals to the rear wheels, and the other end of which is connected to the front wheels. One element of the generator component is the generator itself, with the other being the translator. The electric clutch (as available from Warner Electric Manufacturing, for example) provides both brake and clutch functions for the power capsule as part of the translator within the generator component.

Figure 1:
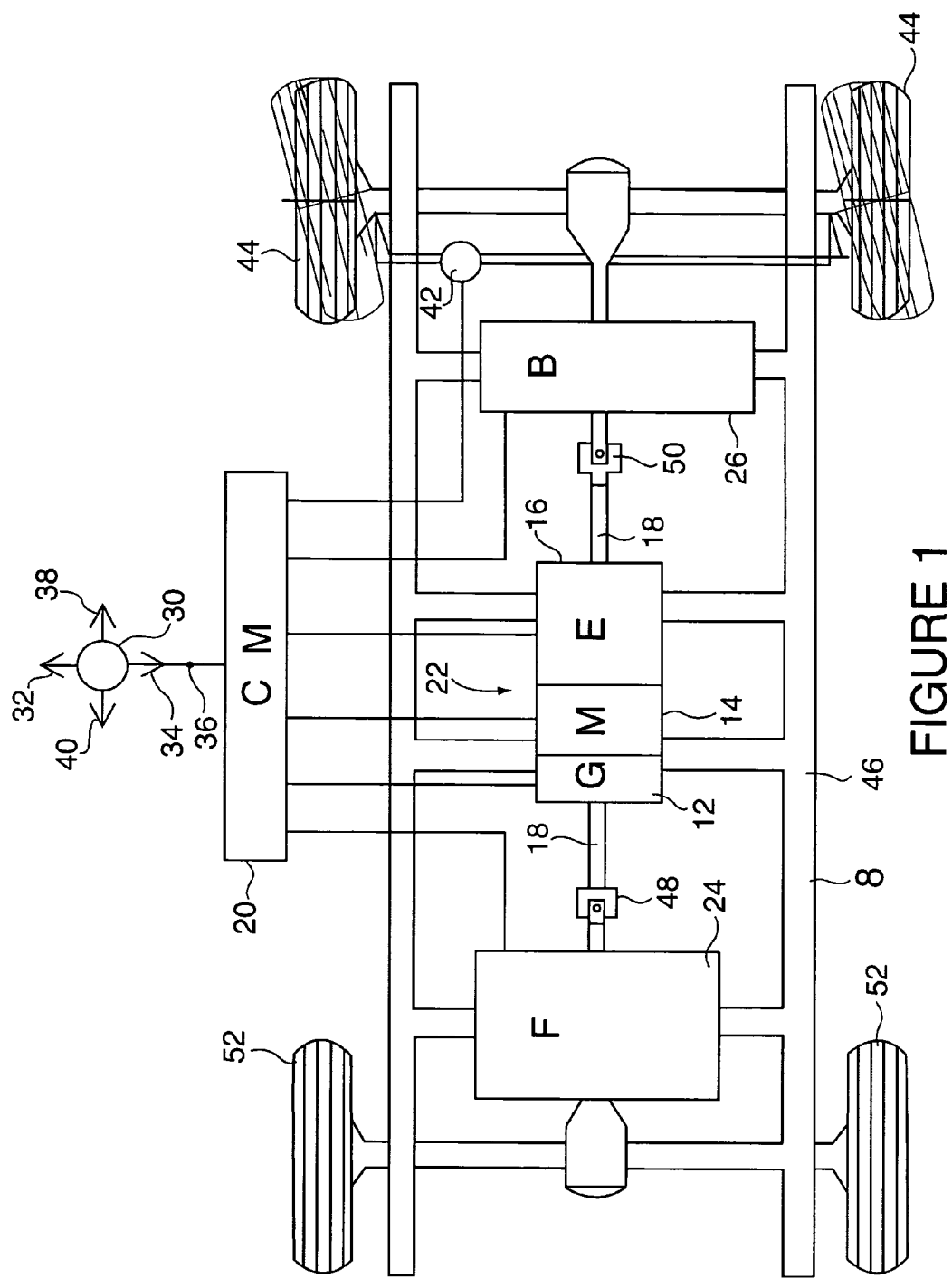
FIG. 1 is a diagrammatical view of the rotary engine system of the invention on a chassis connected to a set of wheels.

In FIG. 1, the three major components of the hybrid rotary engine are shown as the generator 12, the motor 14 and the engine 16. Mounted to a common drive shaft 18, these components are controlled by a programmable central control module 20, with the generator-motor-engine forming a power capsule 22. As will be appreciated, the two shaft "drivers" are the engine 16 and the motor 14, with the shaft "driven" component being the generator 12 and its translator unit (to be more particularly described with respect to FIG. 2). With the engine 16 being operable with most fuels and by both spark or compression ignition, the generator 12 is driven through the drive shaft 18 on a 1:1 ratio, except when driven through the translator unit with its higher ratio as described below. Traditionally, the system of FIG. 1 will continue to operate while there is fuel in its tank 24 or under secondary charge from its battery tank 26. With the engine of the four vane or piston type-of my U.S. Pat. No. 6,698, 395 design effecting four combustions per revolution, the hybrid engine of FIG. 1 then compares to a standard eight-cylinder engine. However, this rotary engine develops more power per cycle with less work since there is an absence of any static reciprocation as in a piston engine. This also will be understood to follow from its absence of valves, cams, camshaft and crankshaft.

FIG. 1 also shows a vertical control lever 30 coupled with the control module 20. Oriented vertically in the vehicle, moving it forward in the direction of the arrow 32 provides acceleration for the vehicle, while moving it rearwardly in the direction of the arrow 34 allows for a braking action—eventually to the position 36 as a full stop. Channeled through the control module 20 in similar fashion, movement of the control lever to the right or left (in the direction of the arrows 38 or 40) allows for steering under the control of the steering motor 42 turning the front wheels 44. With reference numeral 46 identifying the chassis for the vehicle, with reference numerals 48 and 50 identifying its universals, and with reference numeral 52 indicating its rear wheels, the movements of the vertical control lever 30 through the control module 20 thus provides for the acceleration/deceleration of the vehicle, and its turning. No steering wheel or foot pedals are required in allowing for improved accessibility and visibility of the dashboard, and less body movement of the operator for enhanced physical and mechanical efficiency. In implementation, the vertical control lever 30 can be positioned within the vehicle for right and left-side operation and for right and left-hand operator movement.

Figure 2:
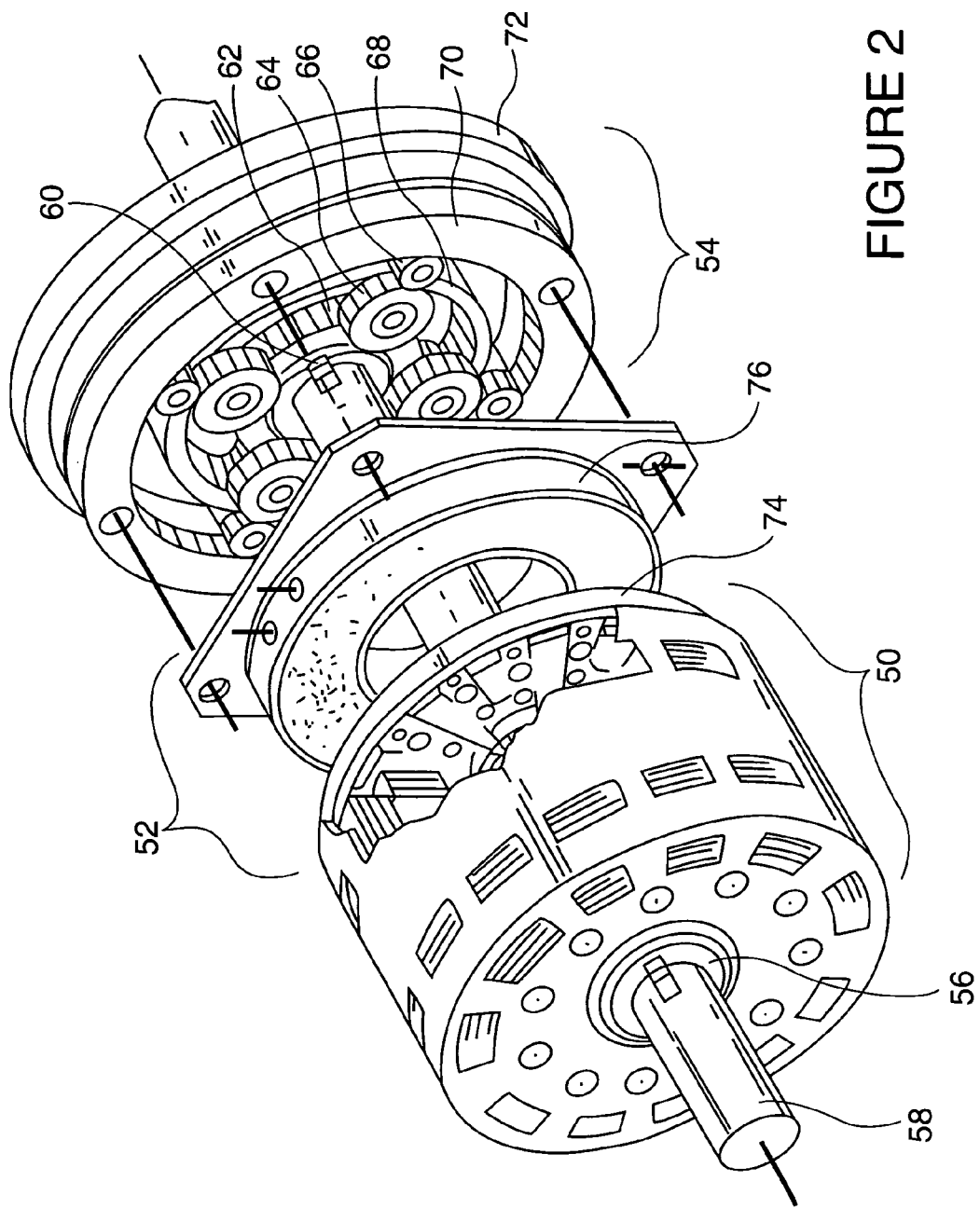
FIG. 2 is a pictorial view of the generator component embodiment helpful in understanding the improved hybrid features of the invention.

With the higher ratio provided by the translator unit of FIG. 2, increased generator revolutions will follow. When engaged by an electric clutch in allowing for increased charging by the generator and braking of the driveshaft, fuel efficiency will be increased.

FIG. 2 shows the generator component of the hybrid rotary engine as including a generator unit 50, an electric clutch unit 52 and a translator unit 54. A generator journal 56 couples with the driveshaft here shown as 58 while the translator journal is shown as 60. As illustrated, the translator unit 54 includes a main gear 62, one or more step gears 64, one or more idler gears 66, an optional inner ring gear 68 and an outer ring gear 70, surrounded by a ground plate 72. With an armature 74 at the generator 50 and a magnet 76 at the clutch unit 52, the outer ring gear 70 drives the generator 50 during slowing at a greater than normal 1:1 ratio because of the reduction gear set 60, 62, 64, 66, 68. During other times, the generator 50 is driven directly off the driveshaft 58 at the normal 1:1 ratio speed.

As will be appreciated, the generator 50 is thus driven by the translator 54 during slowing. With the clutch 52 being joined to both the outer ring gear 70 and to the generator 50, it becomes poised to engage with the armature 74 of the generator 50 as a brake when slowing, as well. In such manner, the translator 54 serves to harness kinetic energy from slowing into first, increased generator revolutions when charging; and second, braking of the driveshaft 58 when slowing, both valuable assets to the operating system. Because the translator unit 54 is securely grounded to the chassis 46, the driveshaft 58 transmits these forces to all four wheels 44, 52 when stopping or slowing.

As will also be appreciated, during reverse, the motor 14 becomes the dominant driver. The engine 16 and generator 12 offer no resistance to the driveshaft 58 in this counter-clockwise direction, but simply override their one-way driveshaft journals while the motor journal is locked to the shaft 58. Such action will follow regardless of the horsepower involved or with other size parameters in adaption to any cab configuration.

Understanding operation of the system of the invention, with "slowing" during normal driving in the traditional sense prior to the inception of the present invention, the vehicle operator removes his/her foot from the gas pedal and touches the brake; here, however, the operator slows by lightly pulling back on the vertical control lever 30. Here, during normal driving, the engine 16 of the invention is the dominant shaft driver; during acceleration, on the other hand, the motor 14 becomes the dominant driver. And, here during slowing, the translator element 54 becomes the dominant driver; while during reverse, the motor 14 becomes the dominant driver once again. With the dual action of the generator component 12 with its electric clutch and translator, where the vehicle is coasting along a downgrade by pulling back on the vertical control lever 30, the batteries are being charged without having to engage or wear the brakes as in a conventional sense—a saving of wasted energy then results. Over the time period of normal driving in normal traffic, this also obviates the expenditure of fuel in accelerating and decelerating, so as to exact enhanced fuel efficiency and reduced fuel consumption and cost. With the rotary engine 16 consisting of one or more rotary units mounted on a shaft and provided with a series of curved vanes, as in my U.S. Pat. No. 6,698,395 construction, mechanically actuated by the impulse of the combustible medium, a small and continually adjustable combustion charge is required in delivering the same degree of power as with conventional reciprocal engines—and, because of the characteristic continuous movement of its rotor and the escalating additional continually adjustable kinetic energy. Such a smaller continuously adjustable charge also ensures the use of less fuel and, accordingly, fewer pollutants.

The control module 20 in this respect will be understood to monitor all component functions including battery charge level, fuel level and engine performance. At any time, the control module 20 can be activated to have the electric motor 14 become the primary driver in preventing battery overcharge. Such control module monitoring is especially essential during acceleration and deceleration when the motor and generator components temporarily become the dominant drivers in place of the engine. At the same time, the control module constantly monitors the degree of the fuel charge in matching rotor revolutions with engine performance.

In operation, the generator, motor and engine components will be seen to be rotatably mounted to the common driveshaft, and electronically controlled by the programmable central control module which maintains an efficient balance of operation between all elements. With the generator, motor and engine components mounted to the driveshaft by a one-way journal bearing and enclosed inside of a housing with an internal rotating element, the engine (when being the dominant driver) provides the rotative power to the driveshaft, which in turn drives the generator. The generator is then always charging as the driveshaft is turning regardless of the driving element—with the motor assisting the engine during acceleration and other moments of demand from the control module. Since the engine and motor charge the batteries, the system cannot run out of electrical power as long as there is fuel in its fuel tank.

With the generator component then being made up of the generator, the translator and the electric clutch, the translator gear set will be seen to be driven by the driveshaft in a clockwise direction. The reduction gear set operates to provide accelerated revolutions to the generator, and direct braking forces of the slowing kinetic energy against the driveshaft—and is made up of a large diameter main gear securely attached to the driveshaft, and a number of smaller, transfer idler gears for reduction, along with an inner and outer ring gear. With the outer ring gear being directly connected to the electric clutch brake, the outer ring gear engages the electric clutch brake to become the generator driver. The driveshaft, in this manner, always drives the translator main gear on the slow side, and through a set of planetary gears drives the translator main gear through a set of gear rings on the fast side. During normal driving, this gear set runs out of engagement to the generator, and may also be temporarily de-coupled from the driveshaft if deemed practical.

Full pull back of the control lever 30 for stopping then de-couples the generator 50 from the electric clutch brake 52 and allows the generator 50 to override its one-way clutch journal 56 and rotate freely, while the translator side of the electric clutch brake 52 is securely coupled and grounded to the translator ground plate 72. This effectively provides positive stopping of all four wheels 44, 52 through the driveshaft 58. As the control lever 30 is pulled back to only slow the vehicle, the electric clutch brake 52 is activated to engage the two elements of the generator component—the generator 50 itself, and the fast moving translator outer ring gear 70. As the generator revolutions then increase, they override the one-way journal, and at the same time cause the oppositely developing braking forces against the driveshaft 58. Kinetic energy thus previously wasted is then harnessed as electrical energy while, at the same time, avoiding traditionally costly brake wear.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the invention.

I claim:

1. In an automotive vehicle having a hybrid engine of the type which includes an electric generator, an electric motor and a rotary internal combustion engine contained in an engine block, the improvement comprising:
   the electric generator of such hybrid engine incorporating a generator unit, an electric clutch unit, and a translator unit serially mounted to a common driveshaft;
   with said translator unit including a planetary gear set and a reduction gear set interacting to drive said generator unit via said electric clutch unit during slowing of the automotive vehicle at a greater than 1:1 ratio; and
   wherein said translator unit drives said generator unit via said electric clutch unit at said 1:1 ratio during other driving of the automotive vehicle.

2. The improvement of claim 1 wherein said electric clutch unit is joined between an outer ring gear of said translator unit and an armature of the electric generator of said hybrid engine.

3. The improvement of claim 2 wherein said translator unit includes a main gear, at least one step gear, at least one idler gear and an outer ring gear, surrounded by a ground plate.

4. The improvement of claim 2, also including a programmable central control module coupled with the generator, motor and rotary internal combustion engine of said hybrid engine mounted to a common driveshaft as a power capsule; wherein during normal driving of the automotive vehicle; said module controls the rotary internal combustion engine to operate as the dominant drive force for said driveshaft; during acceleration, said module controls the motor to operate as said dominant drive force; during slowing, said module controls the translator unit to operate as said dominant drive force; and during reverse, said module controls the motor to operate as said dominant drive force.

5. The improvement of claim 4, additionally including a steering motor for the front wheels of said automotive vehicle coupled to said central control module; and a vertical control lever accessible by a driver within a cab compartment of the automotive vehicle also coupled to said central control module; and wherein side-to-side movement of said lever steers said front wheels from left to right.

6. The improvement of claim 5 wherein said vertical control lever is positioned in said cab compartment for one of right and left-hand driver control.

7. The conibination of claim 5 wherein forward and rearward movement of said lever respectively accelerates and decelerates said vehicle under driver control.

* * * * *